US008937938B2

(12) United States Patent
Kim et al.

(10) Patent No.: US 8,937,938 B2
(45) Date of Patent: Jan. 20, 2015

(54) METHOD AND APPARATUS FOR ACQUIRING UPLINK AND DOWNLINK SYNCHRONIZATION BETWEEN A PLURALITY OF BASE STATIONS AND A TERMINAL IN A COOPERATIVE COMMUNICATION NETWORK

(71) Applicant: Electronics and Telecommunications Research Institute, Daejeon (KR)

(72) Inventors: Jun-Woo Kim, Daejeon (KR); Hyeong Sook Park, Daejeon (KR); Hoon Lee, Daejeon (KR); Seungjae Bahng, Daejeon (KR); Youn Ok Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 141 days.

(21) Appl. No.: 13/841,232

(22) Filed: Mar. 15, 2013

(65) Prior Publication Data

US 2014/0003416 A1 Jan. 2, 2014

(30) Foreign Application Priority Data

Jun. 27, 2012 (KR) .......................... 10-2012-0069449

(51) Int. Cl.
*H04J 3/06* (2006.01)
*H04W 56/00* (2009.01)
*H04W 48/20* (2009.01)

(52) U.S. Cl.
CPC .......... *H04W 56/001* (2013.01); *H04W 56/005* (2013.01); *H04W 48/20* (2013.01); *H04W 56/00* (2013.01)
USPC .......................................... 370/350; 370/503

(58) Field of Classification Search
USPC .................................................. 370/350, 503
See application file for complete search history.

(56) References Cited

U.S. PATENT DOCUMENTS

| 7,675,888 | B2 * | 3/2010 | Modlin et al. ................. 370/335 |
| 2007/0202882 | A1 * | 8/2007 | Ju et al. ......................... 455/450 |
| 2010/0157906 | A1 | 6/2010 | Yang et al. |
| 2010/0273468 | A1 * | 10/2010 | Bienas et al. ................. 455/418 |

(Continued)

FOREIGN PATENT DOCUMENTS

| KR | 10-2008-0101269 A | 11/2008 |
| KR | 10-2009-0114271 A | 11/2009 |

(Continued)

OTHER PUBLICATIONS

Young Jo Ko et al., "LTE-Advanced Standard Technology Tred", KIEES, Mar. 2010, pp. 9-23, vol. 21, No. 2.

*Primary Examiner* — Gary Mui
(74) *Attorney, Agent, or Firm* — Rabin & Berdo, P.C.

(57) ABSTRACT

There is provided a method for acquiring and modifying uplink and downlink synchronization, by which, if there is a possibility of ISI occurring due to incorrect downlink synchronization of a terminal with a base station, the terminal receives a ranging response from the base station, modifies incorrect downlink synchronization, and acquires uplink synchronization in accordance with modified downlink synchronization. The method for acquiring and modifying uplink and downlink synchronization efficiently prevents, in a cooperative communication network, discrepancy in signal transmission synchronization between the base stations, excessive attenuation of a transmitted signal, or a delay caused by a difference in reflection paths.

18 Claims, 5 Drawing Sheets

(56) References Cited

U.S. PATENT DOCUMENTS

| | | |
|---|---|---|
| 2011/0170494 A1 | 7/2011 | Kim et al. |
| 2011/0171949 A1 | 7/2011 | Liao et al. |
| 2011/0211571 A1* | 9/2011 | Ryu et al. .................. 370/350 |
| 2013/0064213 A1* | 3/2013 | Park et al. ................. 370/329 |
| 2013/0286882 A1* | 10/2013 | Lim et al. ................. 370/252 |
| 2014/0206408 A1* | 7/2014 | Choi et al. ................ 455/519 |

FOREIGN PATENT DOCUMENTS

| | | |
|---|---|---|
| KR | 10-2010-0033100 A | 3/2010 |
| WO | WO 2008/140268 A2 | 11/2008 |

* cited by examiner

METHOD AND APPARATUS FOR ACQUIRING UPLINK AND DOWNLINK SYNCHRONIZATION BETWEEN A PLURALITY OF BASE STATIONS AND A TERMINAL IN A COOPERATIVE COMMUNICATION NETWORK

CROSS-REFERENCE TO RELATED APPLICATION

This application claims priority to and the benefit of Korean Patent Application No. 10-2012-0069449 filed in the Korean Intellectual Property Office on Jun. 27, 2012, the entire contents of which are incorporated herein by reference.

BACKGROUND OF THE INVENTION (a) Field of the Invention

The present invention relates to a method and apparatus for acquiring synchronization of a terminal in a cooperative communication network.

(b) Description of the Related Art

A cooperative communication network is a concept that was proposed to solve the problems of signal attenuation caused by multi-path transmission in wireless communication and packet loss cooperation caused by channel error, and to maximize bandwidth efficiency. Cooperative communication allows two or more wireless nodes having a single antenna to transmit data to their destination through multiple paths formed by sharing their resources. Moreover, with the use of cooperative communication, the signal transmission/reception efficiency of a terminal located at a cell boundary can be increased by expanding the coverage of a base station.

In a cooperative communication environment, a plurality of base stations interconnected through a hub node transmit signals simultaneously via downlink under control of the hub node. A terminal at a cell boundary uses preamble signals, which are transmitted via downlink from a plurality of base stations in the vicinity, to acquire downlink synchronization with the base stations. Hereupon, the terminal can acquire information about the conditions of wireless paths to the base stations from the preamble signals.

Proper data transmission timing ensures that all systems interpret the start of the information transfer correctly. A preamble defines a specific series of transmission pulses that is understood by communicating systems to mean "someone is about to transmit data". This ensures that systems receiving the information correctly interpret when the data transmission starts. The actual pulses used as a preamble vary depending on the network communication technology in use.

Respective preamble signals transmitted by the plurality of base stations arrive at the terminal at different times due to different path delays, and the terminal acquires time synchronization for a signal with higher strength or better signal to noise ratio (hereinafter, 'SNR'), among the received preamble signals.

Typically, a signal that arrives at the terminal earlier shows high strength or good SNR. However, a signal that arrives at the terminal later may show higher strength or better SNR when the base stations connected to the hub node are not synchronized, or when signals pass through a relay, or when there is difference between paths through which signals are reflected and arrive at the terminal.

Hereupon, the terminal can acquire time synchronization based on the arrival timing of a preamble signal received later. In this case, a preamble signal that arrives earlier may cause inter-symbol interference (hereinafter, 'ISI') in a demodulation process.

In orthogonal frequency division multiplexing (hereinafter, 'OFDM'), which allows high-speed data to be transmitted in parallel at a low speed, ISI arises when the delay spread time of a data transmission channel is shorter than a symbol duration. In OFDM, fast Fourier transform (hereinafter, 'FFT') is performed so as to demodulate signals received via uplink and downlink. ISI may occur if the start of an FFT execution period is affected by the preceding symbol within the protection period of OFDM symbols.

That is, ISI may occur because an FFT execution period of a signal frame is not included in a period containing a symbol and a cyclic prefix (hereinafter, 'cp') due to delay spread time.

ISI may lower the demodulation performance of a signal and reduce SNR, and therefore it is important to acquire time synchronization of uplink and downlink between the terminal and the base stations to prevent ISI.

The above information disclosed in this Background section is only for enhancement of understanding of the background of the invention, and therefore it may contain information that does not form the prior art that is already known in this country to a person of ordinary skill in the art.

SUMMARY OF THE INVENTION

The present invention has been made in an effort to provide a method for acquiring and modifying uplink and downlink synchronization, by which, if there is a possibility of ISI occurring due to incorrect downlink synchronization of a terminal with a base station, the terminal receives a ranging response from the base station, modifies incorrect downlink synchronization, and acquires uplink synchronization in accordance with modified downlink synchronization.

An exemplary embodiment of the present invention provides a method for a terminal to acquire synchronization with a plurality of base stations, the method including: transmitting a ranging signal; receiving, from a service base station, ranging responses from at least some of the plurality of base stations in response to the ranging signal; determining from the ranging responses whether the at least some of the base stations are in a cooperative communication mode; if the at least some of the base stations are in the cooperative communication mode, comparing timing offsets of the at least some of the base stations, each of the timing offsets being contained in each of the ranging responses; and selecting a base station which has transmitted a ranging response containing a smaller timing offset than the timing offset of the service base station, among the at least some of the base stations, and modifying acquired downlink synchronization based on a preamble signal transmitted from the selected base station.

Another embodiment of the present invention provides a synchronization acquisition apparatus for a terminal, which acquires synchronization with a plurality of base stations, the apparatus including: a ranging signal transmission part that transmits a ranging signal to the plurality of base stations; a ranging response reception part that receives, from a service base station, ranging responses from at least some of the plurality of base stations in response to the ranging signal; a comparison part that determines from the ranging responses whether the at least some of the base stations are in a cooperative communication mode, and if the at least some of the base stations are in the cooperative communication mode, compares timing offsets of the at least some base stations, each of the timing offsets being contained in each of the ranging responses; and a downlink synchronization setup part that selects a base station which has transmitted a ranging response containing a smaller timing offset than the timing offset of the service base station, among the at least some of the base stations, and modifies acquired downlink synchronization based on a preamble signal transmitted from the selected base station.

Yet another embodiment of the present invention provides a service base station selection method for a hub node controlling a plurality of base stations, the method including: receiving ranging responses from at least some of the plurality of base stations in response to the ranging signal from the terminal; comparing power offsets each being contained in each of the ranging responses; and selecting a base station which has transmitted a ranging response containing the smallest power offset, among the at least some of the base stations, as the service base station.

A further embodiment of the present invention provides a hub node apparatus for selecting a service base station by controlling a plurality of base stations, the hub node apparatus including: a ranging response reception part that receives ranging responses from at least some of the plurality of base stations in response to the ranging signal from the terminal; a power offset comparison part that compares power offsets each contained in each of the ranging responses; and a service base station selection part that selects a base station which has transmitted a ranging response containing the smallest power offset, among the at least some of the base stations, as the service base station.

DETAILED DESCRIPTION OF THE EMBODIMENTS

Figure 1:
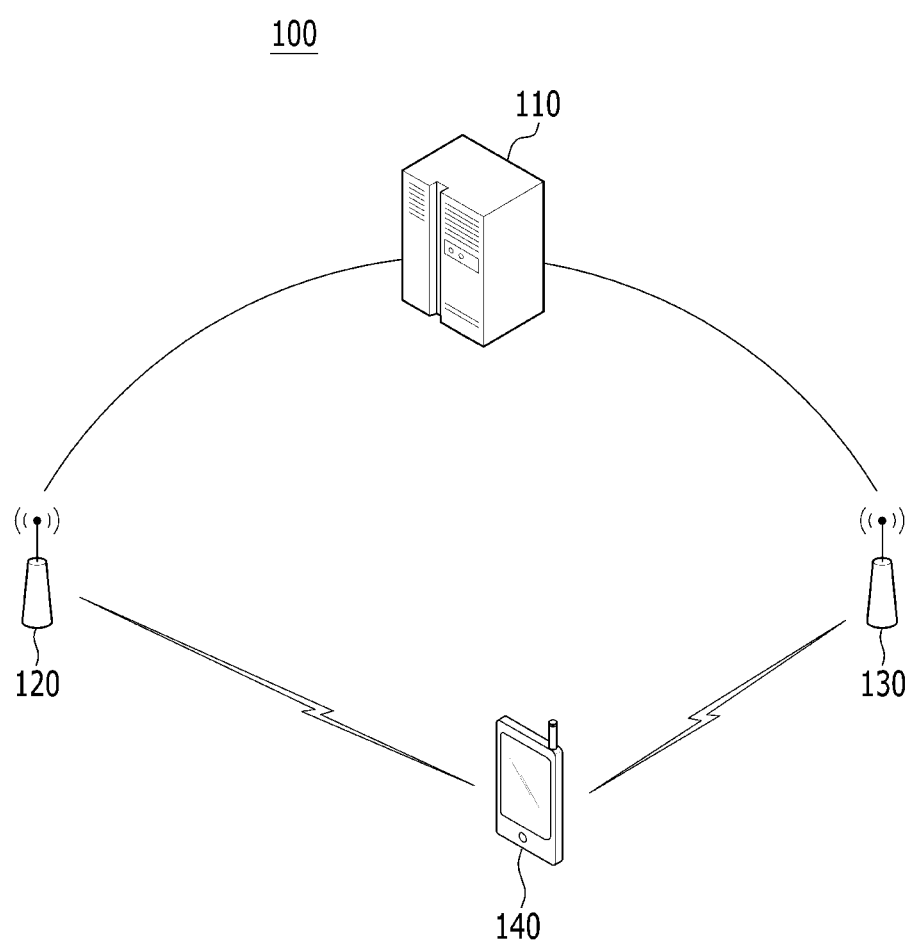
FIG. 1 is a view showing a cooperative communication network according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In this specification, a terminal may designate a mobile terminal (MT), a mobile station (MS), a subscriber station (SS), a portable subscriber station (PSS), an access terminal (AT), user equipment (UE), etc., and may include the entire or partial functions of the MT, the MS, the SS, the PSS, the AT, the UE, etc.

In this specification, a base station (BS) may designate a nodeB, an evolved nodeB (eNodeB), an access point (AP), a radio access station (RAS), a base transceiver station (BTS), a mobile multihop relay (MMR-BS), etc., and may include the entire or partial functions of the nodeB, the eNodeB, the AP, the RAS, the BTS, the MMR-BS, etc.

Hereinafter, downlink (DL) means communication from a base station to a terminal, and uplink (UL) means communication from the terminal to the base station. In downlink, a transmitter may be part of the base station, and a receiver may be part of the terminal. In uplink, a transmitter may be part of the terminal, and a receiver may be part of the base station.

FIG. 1 is a view showing a cooperative communication network according to an exemplary embodiment of the present invention.

Referring to FIG. 1, the cooperative communication network 100 includes a plurality of base stations 120 and 130, a terminal 140, and a hub node 110. The plurality of base stations 120 and 130 are connected to the hub node and transmit signals to the terminal 140 under control of the hub node 110.

The terminal 140 can include a synchronization acquisition device to synchronize with the plurality of base stations 120 and 130.

The hub node 110 controls operations of the plurality of base stations 120 and 130 performing cooperative communication. That is, the hub node 110 allows the plurality of base stations 120 and 130 to transmit signals simultaneously via downlink, and selects a service base station for a specific terminal after comparing ranging responses transmitted from the plurality of base stations 120 and 130.

Figure 2:
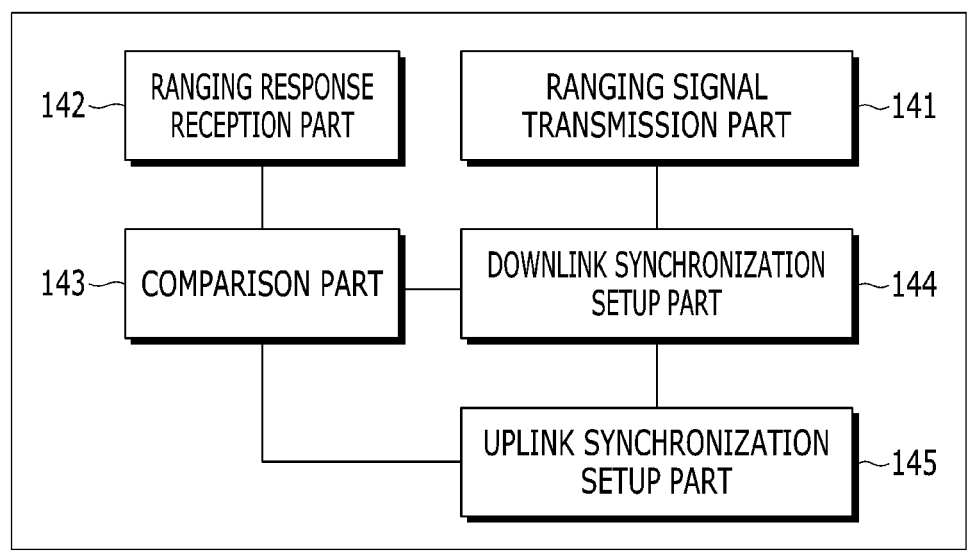
FIG. 2 is a view showing a synchronization acquisition device of a terminal according to an exemplary embodiment of the present invention.

FIG. 2 is a view showing a synchronization acquisition device of a terminal according to an exemplary embodiment of the present invention.

Referring to FIG. 2, the synchronization acquisition device of the terminal 140 includes a ranging signal transmission part 141, a ranging response reception part 142, a comparison part 143, a downlink synchronization setup part 144, and an uplink synchronization setup part 145.

The ranging signal transmission part 141 transmits a ranging signal to the plurality of base stations when the downlink synchronization setup part 144 acquires downlink synchronization.

The ranging response reception part 142 receives a ranging response, which is a response to the ranging signal, from the service base station selected by the hub node. The ranging response received by the ranging response reception part 142 may contain a timing offset and a power offset.

The timing offset is a value used to modify the timing at which the terminal 140 has to transmit a signal in order to acquire uplink synchronization. According to the exemplary embodiment of the present invention, the timing offset may also be used to modify downlink synchronization.

The power offset is a value used to modify the level of signal transmission power of the terminal 140 so that an uplink signal received by a base station has an appropriate level for demodulation.

The comparison part 143 determines from the ranging response received from the service base station whether the base stations having transmitted the ranging responses are in a cooperative communication mode. If they are in the cooperative communication mode, the comparison part 143 compares the timing offsets contained in the ranging responses.

The downlink synchronization setup part 144 receives preamble signals from the plurality of base stations, and acquires downlink synchronization based on the reception timing of a signal with the highest strength or the best SNR, among the received preambles signals.

After acquisition of downlink synchronization, when the comparison part 143 determines that the base stations having transmitted the ranging responses are in the cooperative communication mode, the downlink synchronization setup part 144 receives, from the comparison part 143, results of comparison of the timing offsets contained in the ranging responses, in order to modify the acquired downlink synchronization. Also, the downlink synchronization setup part 144 selects a base station that has transmitted the ranging response containing smaller timing offset than the timing offset of the service base station, and modifies downlink synchronization based on the preamble signal transmitted from the selected base station.

On the contrary, when the comparison part 143 determines that the base stations having transmitted the ranging responses are not in the cooperative communication mode, the downlink synchronization setup part 144 maintains the acquired downlink synchronization.

If downlink synchronization is modified, the uplink synchronization setup part 145 acquires uplink synchronization based on timing obtained by shifting the modified downlink synchronization timing backward by the timing offset of the selected base station.

On the contrary, if downlink synchronization is maintained, the uplink synchronization setup part 145 acquires uplink synchronization based on timing obtained by shifting the maintained downlink synchronization timing backward by the timing offset of the selected base station.

Figure 3:
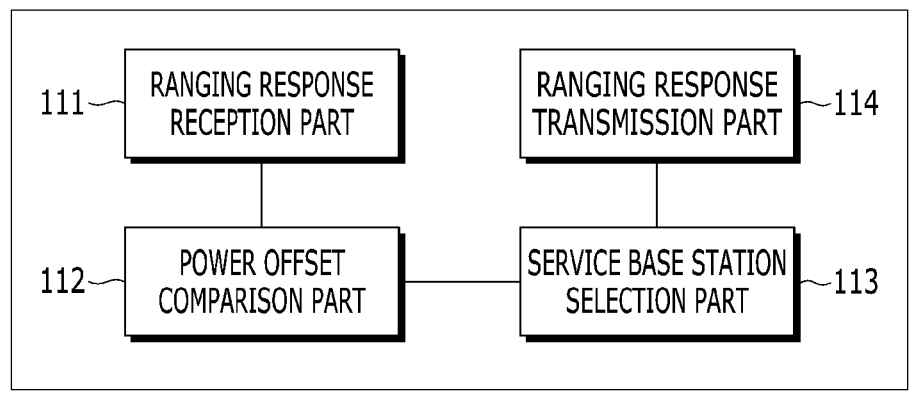
FIG. 3 is a view showing a hub node for selecting a service base station according to an exemplary embodiment of the present invention.

FIG. 3 is a view showing a hub node for selecting a service base station according to an exemplary embodiment of the present invention.

Referring to FIG. 3, the hub node 110 includes a ranging response reception part 111, a power offset comparison part 112, a service base station selection part 113, and a ranging response transmission part 114.

The ranging response reception part 111 receives a ranging response from at least some of the plurality of base stations in response to a ranging signal from the terminal 140. At least some of the plurality of base stations may be in the cooperative communication mode.

The power offset comparison part 112 compares the power offsets contained in the ranging responses received from at least some of the plurality of base stations.

The service base station selection part 113 selects a service base station based on a result of comparison of the power offsets from the power offset comparison part 112.

The ranging response transmission part 114 collects the ranging responses received from at least some of the plurality of base stations and transmits them to the service base station selected by the service base station selection part 113.

Hereinafter, a process of uplink and downlink synchronization in a cooperative communication network will be described with reference to FIGS. 4 to 6.

Figure 4:
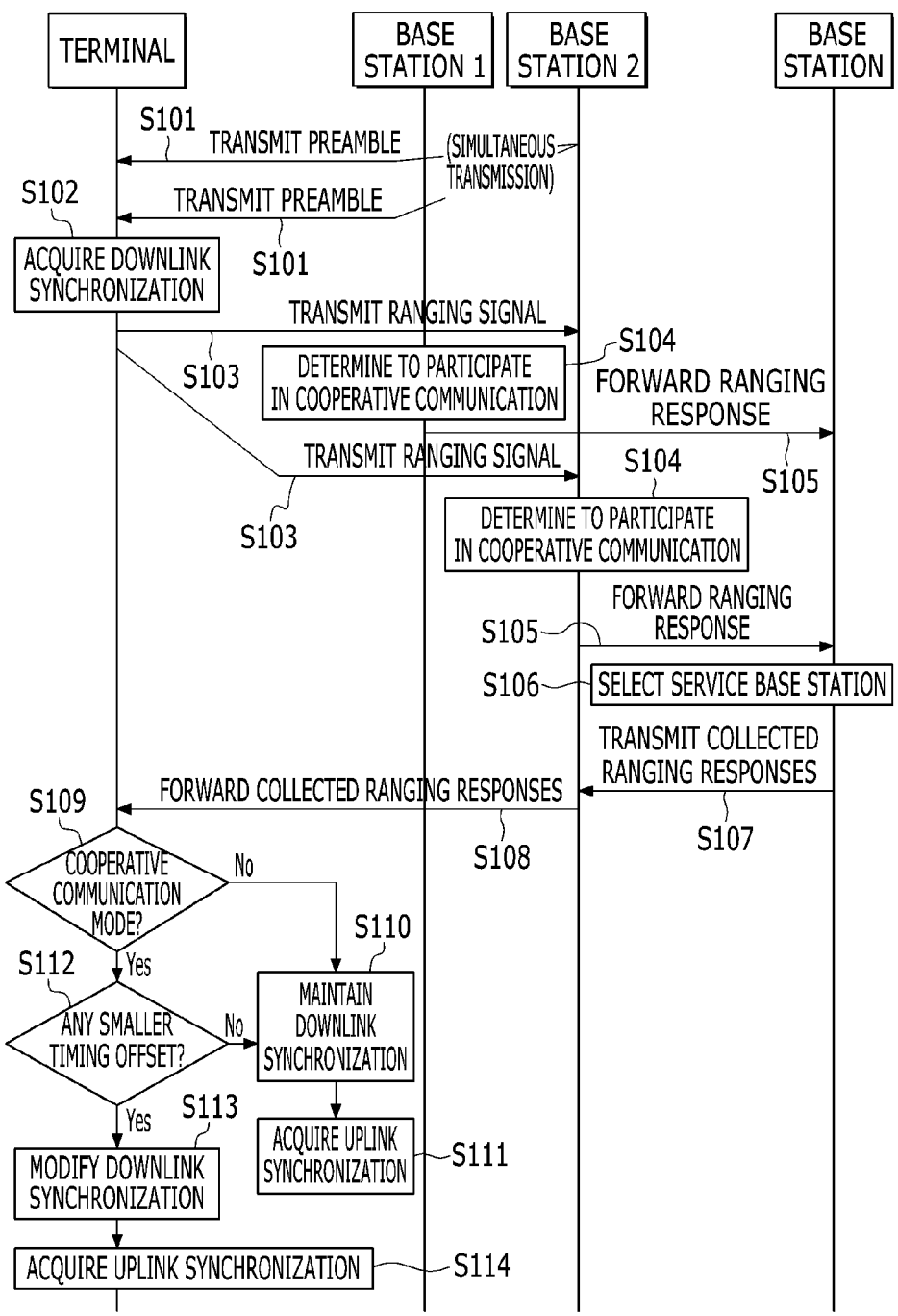
FIG. 4 is a sequential chart showing a synchronization acquisition and modification process of a terminal in a cooperative communication network according to an exemplary embodiment of the present invention.

FIG. 4 is a sequential chart showing a synchronization acquisition and modification process of a terminal in a cooperative communication network according to an exemplary embodiment of the present invention.

Referring to FIG. 4, first of all, a first base station 120 and a second base station 130 transmit preamble signals via downlink under control of the hub node 110 (S101).

Hereupon, the base stations can simultaneously transmit the preamble signals by broadcasting.

The terminal 140 receives the preamble signals transmitted from the base stations. The terminal 140 may receive the preamble signals at different times because the distances between the respective base stations and the terminal 140 are different, and due to the diversity of transmission paths.

Figure 5:
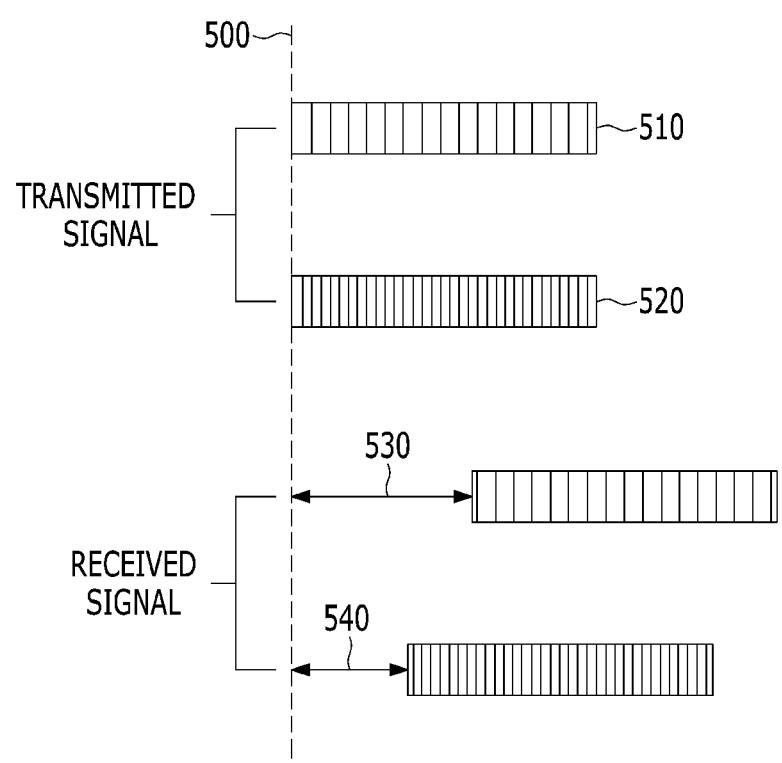
FIG. 5 is a view showing transmission and reception timing of preambles according to an exemplary embodiment of the present invention.

FIG. 5 is a view showing transmission and reception timings of preambles according to an exemplary embodiment of the present invention.

Referring to FIG. 5, a preamble signal 510 transmitted from the first base station 120 arrives at the terminal 140 after a first delay time 530 has elapsed from a base station's downlink start time 500, and a preamble signal 520 transmitted from the second base station 130 arrives at the terminal 140 after a second delay time 540 has elapsed.

Thereafter, referring again to FIG. 4, the terminal 140 acquires time synchronization based on reception timing of a signal with the highest strength or the best SNR, among received preamble signals (S102).

This is because, in cooperative communication for receiving data of the same content from the plurality of base stations 120 and 130, time synchronization is acquired based on a reception complete timing of data, and it is highly likely that data reception will be completed at a signal with high strength or good SNR.

Typically, a signal that arrives at the terminal earlier shows high strength or good SNR. However, a signal that arrives at the terminal 140 later may show higher strength when the base stations connected to the hub node 110 are not synchronized in terms of signal transmission, or when the strength of transmitted signals becomes lower as they pass through a relay, or when there is a reduction in SNR due to difference between reflection paths.

Hereinafter, the exemplary embodiment of the present invention will be described with respect to an uplink synchronization acquisition process and a downlink synchronization modification process when the terminal 140 acquires downlink time synchronization based on a preamble signal transmitted from the first base station 120, which is more distant from the terminal 140 than the second base station 130 is from the terminal 140.

Having acquired downlink synchronization after receiving a preamble from a base station, the terminal 140 transmits a ranging signal via uplink (S103).

The ranging signal transmitted from the terminal 140 may contain information about the base station with which downlink time synchronization has been acquired.

Having received the ranging signal, the base station determines whether to participate in cooperative communication (S104). In the exemplary embodiment of the present invention, it is assumed that the first base station 120 and the second base station 130 participate in cooperative communication.

Afterwards, having determined to participate in cooperative communication, the base station measures a timing offset and a power offset from the ranging signal received from the terminal 140.

Figure 6:
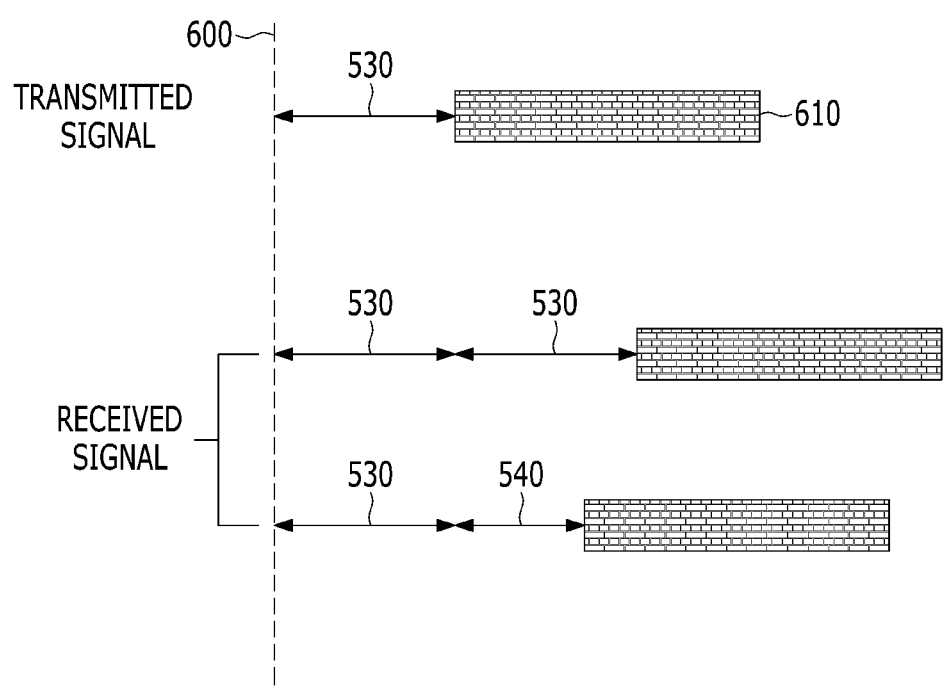
FIG. 6 is a view showing transmission and reception timing of a ranging signal according to an exemplary embodiment of the present invention.

FIG. 6 is a view showing transmission and reception times of a ranging signal according to an exemplary embodiment of the present invention.

Referring to FIG. 6, the terminal 140 acquires downlink synchronization based on a preamble signal transmitted from the first base station 120, and therefore the terminal 140 starts to transmit a ranging signal 610 via uplink after a first delay time 540 has elapsed from an uplink transmit time 600. The uplink transmit time 600 is a 'reference time' that is the same for a plurality of base stations.

The first base station 120 receives the ranging signal 610 at a time that is delayed from the uplink transmit time 600 by a first delay time 530 plus another first delay time 530, and the second base station 130 receives the ranging signal 610 at a time that is delayed from the uplink transmit time 600 by a first delay time 530 plus a second delay time 540.

Thereafter, referring again to FIG. 4, the base stations each forward a ranging response containing measured times and power offsets to the hub node 110 (S105).

The hub node 110 collects a plurality of ranging responses transmitted from the base stations participating in cooperative communication and analyzes the ranging responses, and then selects a service base station of the terminal 140 (S106).

The hub node 110 selects, as the service base station of the terminal 140, a base station which has transmitted a ranging response containing the smallest power offset. A small power offset means that the difference in signal transmission power that the terminal 140 has to adjust is small, and the smallest difference in signal transmission power means that the strength of a signal received via uplink is the highest. Hence, the hub node 110 selects a base station that is capable of receiving a signal with the highest strength as the service base station of the terminal 140.

Then, the hub node 110 transmits the collected ranging responses to the service base station (S107). In the exemplary embodiment of the present invention, it is assumed that the first base station 120 is selected as the service base station, and the first base station 120 forwards the collected ranging responses to the terminal 140 (S108).

Here, referring to FIG. 6, the ranging response from the first base station 120 requests the terminal 140 to transmit an uplink signal earlier by 'first delay time plus first delay time', and the ranging response from the second base station 130 requests the terminal 140 to transmit an uplink signal earlier by 'first delay time plus second delay time'.

Referring again to FIG. 4, the terminal 140 receives the ranging responses passed from the service base station, and then checks if the plurality of base stations that have transmitted the ranging responses are in the cooperative communication mode, and determines whether to modify downlink synchronization (S109).

According to the exemplary embodiment of the present invention, the terminal 140 receives a ranging response from the service base station (first base station), and modifies acquired downlink synchronization with reference to the timing offset contained in the ranging response before acquiring uplink synchronization in accordance with the timing offset and power offset contained in the ranging response.

If it is determined that only the ranging response from one base station is transmitted and therefore the plurality of base stations are not in the cooperative communication mode, the terminal 140 maintains current downlink synchronization (S110).

That is, in the case that only the first base station 120 transmits a ranging response because the plurality of base stations are not in the cooperative communication mode, the terminal 140 maintains downlink synchronization and transmits an uplink signal earlier by 'first delay time plus first delay time' in response to the ranging response from the first base station 120, thereby acquiring uplink synchronization (S111).

On the contrary, if it is currently determined that a plurality of ranging responses are transmitted to the terminal 140 and therefore the plurality of base stations are in the cooperative communication mode, the terminal 140 checks the timing offsets contained in the ranging responses and detects if there is a base station that has transmitted a ranging response containing a smaller timing offset than the timing offset contained in the ranging response transmitted from the service base station, in order to modify the acquired downlink synchronization (S112).

If there is a ranging response containing a smaller timing offset than the timing offset contained in the ranging response from the first base station 120 (service base station), among the received ranging responses, the terminal 140 modifies downlink synchronization in accordance with the base station which has transmitted the ranging response, and then acquires uplink synchronization.

In the exemplary embodiment of the present invention, the timing offset of the second base station 130 is smaller (first delay time+first delay time>first delay time+second delay time). Therefore, the terminal 140 modifies the previously acquired downlink synchronization in accordance with this timing offset, and then acquires uplink synchronization.

In this case, according to the exemplary embodiment of the present invention, the terminal 140 modifies downlink synchronization based on the arrival time of the preamble signal transmitted from the second base station 130, by advancing the downlink synchronization timing toward the downlink start time by the difference between the first delay time 530 and the second delay time 540 (S113).

Subsequently, once the terminal 140 has modified downlink synchronization with reference to the ranging response from the second base station 130, the terminal 140 modifies the uplink signal transmission timing in accordance with the modified downlink synchronization.

That is, if the plurality of base stations are in the cooperative communication mode, the terminal 140 modifies the downlink synchronization timing in accordance with the ranging response from the second base station 130, and transmits an uplink signal earlier by 'second delay time plus second delay time', thereby acquiring uplink synchronization (S114).

As seen above, according to the exemplary embodiment of the present invention, a terminal can acquire and modify uplink and downlink synchronization in an efficient manner so as to prevent inter-symbol interference caused by different reception times of signals transmitted and received between a plurality of base stations and the terminal in a cooperative communication network. In other words, a method for acquiring and modifying uplink and downlink synchronization is provided, which efficiently prevents, in a cooperative communication network, discrepancy in signal transmission synchronization between the base stations, excessive attenuation of a transmitted signal, or a delay caused by difference in reflection paths.

Moreover, because a hub node selects a service base station of the terminal based on ranging responses generated from the respective base stations, a base station with the highest strength of an uplink reception signal is selected as the service base station of the terminal.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A method for a terminal to acquire synchronization with a plurality of base stations, the method comprising:
   transmitting a ranging signal;
   receiving, from a service base station, ranging responses from at least some of the plurality of base stations in response to the ranging signal;

determining from the ranging responses whether the at least some of the base stations are in a cooperative communication mode;

if the at least some of the base stations are in the cooperative communication mode, comparing timing offsets of the at least some of the base stations, each of the timing offsets being contained in each of the ranging responses; and selecting a base station which has transmitted a ranging response containing a smaller timing offset than the timing offset of the service base station, among the at least some of the base stations, and modifying acquired downlink synchronization based on a preamble signal transmitted from the selected base station.

2. The method of claim 1, further comprising, before transmitting the ranging signal:

receiving preambles signals from the plurality of base stations; and acquiring downlink synchronization from the preamble signal received from the first base station among the plurality of base stations.

3. The method of claim 2, wherein the acquiring of downlink synchronization comprises:

comparing the strengths or signal-to-noise ratios (SNRs) of the preamble signals; and acquiring downlink synchronization based on reception timing of a preamble signal with the highest strength or the best SNR, among the preamble signals.

4. The method of claim 2, wherein the determining of whether the at least some of the base stations are in the cooperative communication mode comprises, if the at least some of the base stations are not in the cooperative communication mode, maintaining the acquired downlink synchronization.

5. The method of claim 4, further comprising, after the maintaining of the downlink synchronization:

acquiring uplink synchronization based on timing obtained by shifting the maintained downlink synchronization timing backward by the timing offset of the first base station.

6. The method of claim 2, wherein the modifying of the downlink synchronization comprises modifying the acquired downlink synchronization by the difference between the timing offset of the selected base station and the timing offset of the first base station.

7. The method of claim 6, further comprising, after the modifying of the downlink synchronization:

acquiring uplink synchronization based on timing obtained by shifting the modified downlink synchronization timing backward by the timing offset of the selected base station.

8. The method of claim 1, wherein each of the ranging responses further comprises a power offset, and the service base station, which has transmitted a ranging response containing the smallest power offset among the at least some of the base stations, is selected by a hub node connected to the plurality of base stations.

9. A synchronization acquisition apparatus for a terminal, which acquires synchronization with a plurality of base stations, the apparatus comprising:

a ranging signal transmission part that transmits a ranging signal to the plurality of base stations;

a ranging response reception part that receives, from a service base station, ranging responses from at least some of the plurality of base stations in response to the ranging signal;

a comparison part that determines from the ranging responses whether the at least some of the base stations are in a cooperative communication mode, and if the at least some of the base stations are in the cooperative communication mode, compares timing offsets of the at least some base stations, each of the timing offsets being contained in each of the ranging responses; and a downlink synchronization setup part that selects a base station which has transmitted a ranging response containing a smaller timing offset than the timing offset of the service base station, among the at least some of the base stations, and modifies acquired downlink synchronization based on a preamble signal transmitted from the selected base station.

10. The apparatus of claim 9, wherein, before modifying downlink synchronization, the downlink synchronization setup part receives preamble signals from the plurality of base stations, and acquires downlink synchronization from the preamble signal received from the first base station, among the plurality of base stations.

11. The apparatus of claim 10, wherein the downlink synchronization setup part compares the strengths or signal-to-noise ratios of the preamble signals, and acquires downlink synchronization based on a reception timing of a preamble signal with the highest strength or the best SNR, among the preamble signals.

12. The apparatus of claim 10, wherein, if the at least some of the base stations are not in the cooperative communication mode, the downlink synchronization setup part maintains the acquired downlink synchronization.

13. The apparatus of claim 12, further comprising an uplink synchronization setup part that acquires uplink synchronization based on timing obtained by shifting the maintained downlink synchronization timing backward by the timing offset of the first base station.

14. The apparatus of claim 10, wherein the downlink synchronization setup part modifies the acquired downlink synchronization by the difference between the timing offset of the selected base station and the timing offset of the first base station.

15. The apparatus of claim 14, further comprising an uplink synchronization setup part that acquires uplink synchronization based on timing obtained by shifting the modified downlink synchronization timing backward by the timing offset of the selected base station.

16. The apparatus of claim 9, wherein each of the ranging responses further comprises a power offset, and the service base station, which has transmitted a ranging response containing the smallest power offset among the at least some of the base stations, is selected by a hub node connected to the plurality of base stations.

17. A service base station selection method for a hub node controlling a plurality of base stations, the method comprising:

receiving ranging responses from at least some of the plurality of base stations in response to the ranging signal from the terminal;

comparing power offsets each being contained in each of the ranging responses; and selecting a base station which has transmitted a ranging response containing the smallest power offset, among the at least some of the base stations, as the service base station.

18. The method of claim 17, wherein the at least some of the base stations are in the cooperative communication mode, and after the selecting of the service base station,
the method further comprises transmitting, to the service base station, the ranging responses received from the at least some of the base stations.

\* \* \* \* \*